US006487220B2

(12) United States Patent
Matsuzaki et al.

(10) Patent No.: US 6,487,220 B2
(45) Date of Patent: Nov. 26, 2002

(54) CONTENT-BASED MULTIPLEXER DEVICE AND MULTIPLEXING METHOD

(75) Inventors: Kazuhiro Matsuzaki, Tokyo (JP); Yoshiaki Kato, Tokyo (JP); Tokumichi Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/905,972

(22) Filed: Jul. 17, 2001

(65) Prior Publication Data

US 2001/0040889 A1 Nov. 15, 2001

Related U.S. Application Data

(62) Division of application No. 08/892,094, filed on Jul. 14, 1997.

(30) Foreign Application Priority Data

Aug. 29, 1996 (JP) .............................................. 8-228317

(51) Int. Cl.[7] .................................................. H04J 3/16
(52) U.S. Cl. .................... 370/487; 370/539; 348/385.1; 348/423.1
(58) Field of Search .................................. 370/532, 535, 370/537, 538, 539, 540, 541, 486, 487, 468; 348/6, 7, 9, 14, 385.1, 423.1

(56) References Cited

U.S. PATENT DOCUMENTS

| 4,893,306 | A | | 1/1990 | Chao et al. | |
|---|---|---|---|---|---|
| 5,140,584 | A | | 8/1992 | Suzuki | |
| 5,251,209 | A | | 10/1993 | Jurkevich et al. | |
| 5,506,844 | A | | 4/1996 | Rao | |
| 5,541,919 | A | | 7/1996 | Yong et al. | |
| 5,563,884 | A | * | 10/1996 | Fimoff et al. | ............... 370/391 |
| 5,635,978 | A | * | 6/1997 | Alten et al. | ..................... 348/7 |
| 5,671,226 | A | * | 9/1997 | Murakami et al. | .......... 370/474 |
| 5,682,387 | A | | 10/1997 | Satoh | |
| 5,757,417 | A | * | 5/1998 | Aras et al. | ..................... 348/10 |
| 5,831,985 | A | | 11/1998 | Sandorfi | |
| 5,835,498 | A | | 11/1998 | Kim et al. | |
| 5,896,128 | A | * | 4/1999 | Boyer | ........................ 345/327 |

FOREIGN PATENT DOCUMENTS

| EP | 0388951 | 9/1990 |
|---|---|---|
| EP | 0596624 | 5/1994 |
| JP | 62135033 | 6/1987 |
| JP | 04157844 | 5/1992 |
| JP | 04170118 | 6/1992 |
| WO | 9619882 | 6/1996 |

OTHER PUBLICATIONS

Description of STATMUTM (statistical multiplexing and variable bit rate) from Nov. 1996 General Instrument Catalog.

Tayer, M.L., "Beyond MPEG:," General Instrument Corporation (Apr. 1997) pp. 1–5.

"Technological conditions in a satellite digital broadcasting system . . . ," Telecommunications Council in the Ministry of Posts and Telecommunications, Consultation No. 74 (Jul. 24, 1995) pp. 1–51.

* cited by examiner

*Primary Examiner*—Min Jung
(74) *Attorney, Agent, or Firm*—Birch, Stewart, Kolasch & Birch, LLP

(57) ABSTRACT

The multiplexer device comprises a multiplexing means for multiplexing a plurality types of media information and outputting a multiplexed bit stream, a priority deciding means for deciding priority corresponding to each of the media information, and a multiplexing controller for controlling multiplexing of each of the media information according to the multiplexing means based on the priority decided by the priority deciding means. In addition the priority in each information is multiplexed.

16 Claims, 9 Drawing Sheets

FIG.4

| PACKET IDENTIFYING INFORMATION | PROGRAM IDENTIFYING INFORMATION | GROUP IDENTIFYING INFORMATION | PRIORITY | | | |
|---|---|---|---|---|---|---|
| | | | IN PROGRAM | AMONG PROGRAMS | IN GROUP | AMONG GROUPS |
| 1 | 1 | 1 | 1 | 1 | 1 | 1 |
| 2 | | | 2 | | 2 | |
| 3 | | | 3 | | 3 | |
| 4 | 2 | | 1 | 2 | 4 | |
| 5 | | | 2 | | 5 | |
| 6 | 3 | 2 | 1 | 1 | 2 | 2 |
| .. | .. | .. | .. | .. | .. | .. |
| .. | .. | .. | .. | .. | .. | .. |
| 1 | j | k | 1 | 1 | m | n |
| .. | | | .. | .. | .. | |

35a    35b    35c    35d

CONTENT-BASED MULTIPLEXER DEVICE AND MULTIPLEXING METHOD

This application is a divisional of co-pending application Ser. No. 08/892,094, filed on Jul. 14, 1997, the entire contents of which are hereby incorporated by reference and for which priority is claimed under 35 U.S.C. § 120; and this application claims priority of application Ser. No. 08-228317 filed in Japan on Aug. 29, 1996 under 35 U.S.C. § 119.

FIELD OF THE INVENTION

The present invention relates to a multiplexer device for multiplexing multimedia data (media information) such as digitalized video signals, acoustical signals, and other data or the like. Multiplexed data is encoded to be transmitted or to be accumulated or for other purposes, and is applicable, as a concrete example of application, to a digital broadcasting system using satellites, ground waves, cables, or optical fibers, video on demand (VOD), and a teleconference system or the like.

BACKGROUND OF THE INVENTION

FIG. 8 is a functional block diagram showing, as an example, a conventional type of multiplexing transmitting system described in the report of the Telecommunications Council in the Ministry of Posts and Telecommunications, Consultation No. 74:

"Technological conditions in a satellite digital broadcasting system (which uses a 27 MHz band width), said satellite using a band width in a range from 12.2 to 12.75 GHz in "Technological conditions according to a digital broadcasting system"" (July, 1995).

In FIG. 8, designated at the reference numeral at 1 is a video encoding section, at 2 a sound encoding section, at 3 a data encoding section, at 4 a multiplexing section, at 5 a transmission scramble section, at 6 an error correction encoding section, and at 7 modulating section.

Next description is made for operations of the multiplexing transmitting system based on the conventional technology.

In the video encoding section 1, sound encoding section 2, and data encoding section 3, a video signal 11, an acoustic signal 12, and various types of data signal 13 are subjected to information-source encoding respectively.

The multiplexing section 4 multiplexes a video encoded bit stream 14, a sound encoded bit stream 15, and data encoded bit stream 16 each generated according to the information-source encoding for each packet and generates a multiplexed bit stream 17.

The transmission scramble section 3 performs energy dispersal to the multiplexed bit stream 17. The error correction encoding section 6 subjects a multiplexed bit stream 18 after the energy dispersal to error correction encoding. The modulating section 7 subjects a multiplexed bit stream 19 after the error correction encoding to modulation suitable for a transmission line and generates a transmission signal 20 in a specified frequency band.

Description is made for the multiplexing section 4 with reference to FIG. 9. In FIG. 9, the reference numeral 8 indicates a multiplexed additional information generating section for generating information indicating multiplexing and arrangement conditions or the like when each of the encoded bit streams 14 to 16 are multiplexed. Multiplexed additional information 21 such as PSI (Program Specific Information) specified in the ISO/IEC 13818-1 publication or SI (Service Information) specified in the European DVB (Digital Video Broadcasting) is generated by the multiplexed additional information generating section 8.

The packet multiplexing section 9 multiplexes the video encoded bit stream 14, sound encoded bit stream 15, data encoded bit stream 16 and multiplexed additional information 21 for each packet according to the multiplexed additional information 21 from the multiplexed additional information generating section 8 and generates a multiplexed bit stream 17.

The conventional type of multimedia multiplexing/transmitting system has the configuration as described above, which makes it difficult to multiplex information by flexibly using any band according to the priority in the information, for instance, by deciding the priority for each type of video and speech or the like and deciding the priority to any object appearing in the video and speech or the like, namely, a comparatively more amount of information is allocated to the information with the higher priority to be multiplexed while a comparatively less amount thereof is allocated to that with lower priority to be multiplexed.

Also, in the side where the multiplexed bit stream is received, it is difficult to edit and process the received information according to the priority or for each object.

Further, since information is not hierarchically classified into important information and not-important information to be transmitted, it is difficult to provide a function of stepped degradation; so called the function of graceful degradation in received information according to the quality of a transmission line.

SUMMARY OF THE INVENTION

It is an object of the present invention to enable multiplexing of information flexibly and efficiently by multiplexing the information according to the priority therein. It is another object of the present invention to realize multiplexer which has sufficient resistance to an error of transmission line and also has a function of graceful degradation.

A multiplexer device according to the present invention comprises a multiplexing means for multiplexing a plurality stream, a priority deciding means for deciding priority corresponding to each of the media information, and a multiplexing controller for controlling multiplexing of each of the media information according to the priority decided by the priority deciding means.

In the multiplexer device, the multiplexing means comprises a media multiplexer for multiplexing the plurality types of media information and generating a media multiplexed bit stream for each program, and a program multiplexer for multiplexing a plurality of the media multiplexed bit streams outputted from this media multiplexer and generating a program multiplexed bit stream, the priority deciding means decides priority for each of the media information as well as for each of the programs, and the multiplexing controller controls multiplexing of each of the media information by the media multiplexer according to the priority for the media information and also controls multiplexing of each of the media multiplexed bit streams by the media multiplexer according to the priority for the program.

The multiplexer device comprises a channel coder for subjecting the multiplexed bit stream outputted from the multiplexing means to channel coding according to the priority from the priority deciding means and transmitting the subjected multiplexed bit stream.

In the multiplexer device, the priority deciding means decides priority in each media information according to contents information corresponding to each of the media information, or decides priority in each program according to contents information corresponding to each of the programs.

The multiplexer device comprises a priority correlation table information generating means for generating both or one of information indicating association and priority between media information or between programs, and the multiplexing means multiplexes the priority correlation table information.

In the multiplexer device, the priority correlation table information comprises a packet identifying information for discretely identifying the media information multiplexed for each packet, program identifying information for identifying each program, group identifying information indicating association between programs, and priority information indicating the priority.

In the multiplexer device, further, the priority information comprises priority information for each program and priority information for each media information constituting each program.

A multiplexing/transmitting method according to the present invention comprises the steps of deciding priority corresponding to a plurality types of media information, controlling multiplexing of each media information according to the decided priority, and outputting a multiplexed bit stream.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is an explanatory view showing an example of priority correlation table information in the multiplexing transmitter according to the embodiment of the present invention;

DESCRIPTION OF THE PREFERRED EMBODIMENTS

Description is made hereinafter for embodiments of the present invention.

Figure 1:
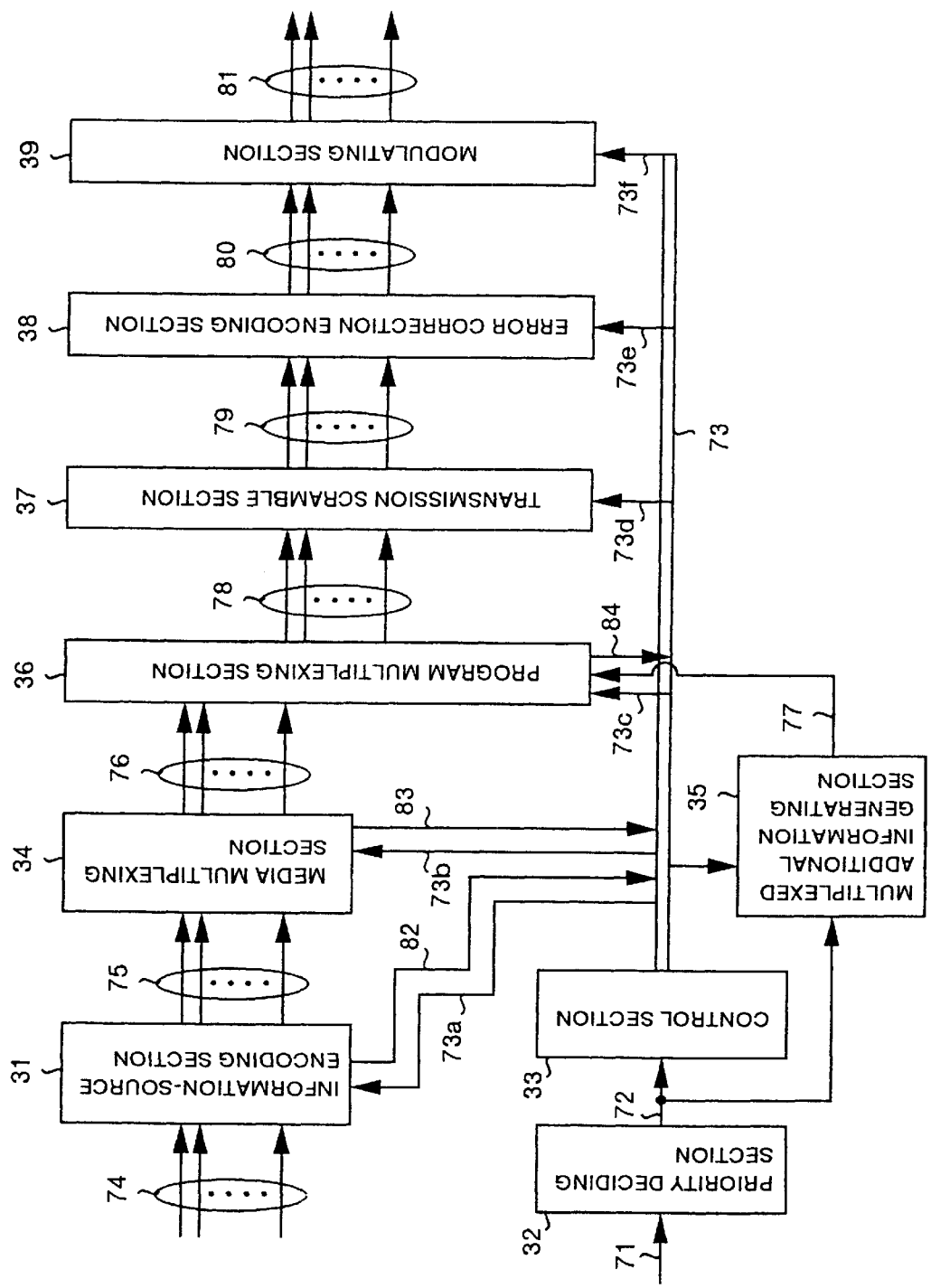
FIG. 1 is a block diagram showing a multiplexing transmitter according to the embodiment of the present invention.

FIG. 1 is a block diagram showing configuration of the multiplexed transmitter according to the present invention.

In the figure, designated at the reference numeral 31 is an information-source encoding section, at 32 a priority deciding section as a priority deciding means, at 33 a control section as a multiplexing controller, at 34 a multiplexed additional information generating section as a priority correlation table information generating means, at 36 a program multiplexing section as a program multiplexer, at 37 a transmission scramble section, at 38 an error correction encoding section, and at 39 a modulating section. A channel coder comprises the transmission scramble section 37, error correction encoding section 38, and modulating section 39.

Figure 2:
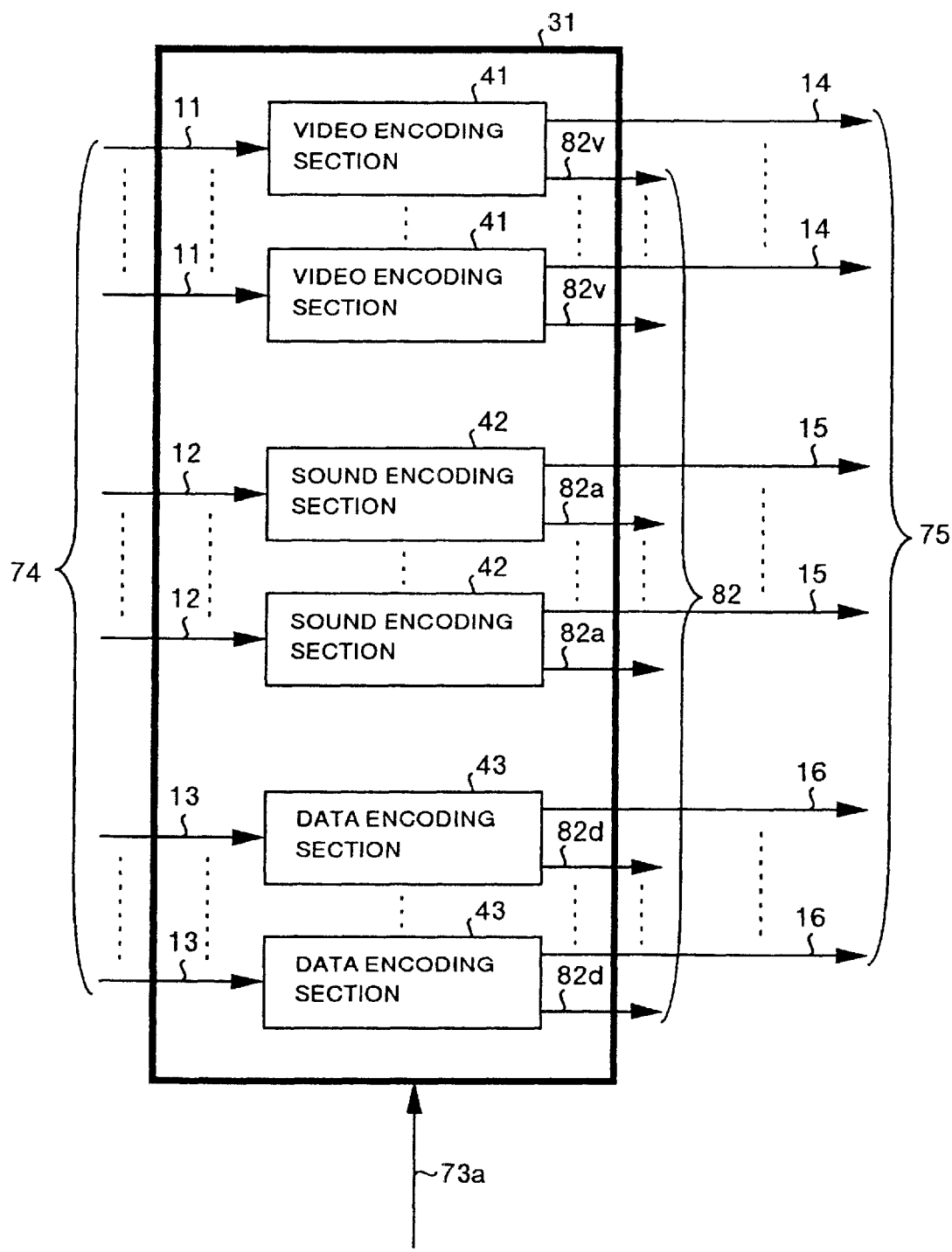
FIG. 2 is a block diagram showing an information-source encoding section in the multiplexing transmitter according to the embodiment of the present invention.

Next description is made for operations. The information-source encoding section 31 comprises, as shown in FIG. 2 showing the configuration thereof, a plurality of video encoding sections 41, sound encoding sections 42, and data encoding sections 43.

Each of the encoding sections subjects a plurality of video signals 11, acoustic signals 12, and various types of data signal 13 each included in inputted media signals 74 to information-source encoding according to information-source encoding characteristics (quantizing characteristics, an encoded bit rate, or the like) shown in a control signal 73a from the control section 33, generates an encoded bit stream 75 comprising video encoded bit streams 14, sound encoded bit streams 15, and data encoded bit streams 16, and also generates a bit rate 82 comprising a video encoded bit rate 82v, a sound encoded bit rate 82a, and a data encoded bit rate 82d each corresponding to each media signal. The bit rate 82 is sent to the control section 33.

The encoded bit streams 75 are sent to the media multiplexing section 34 to be multiplexed.

Figure 3:
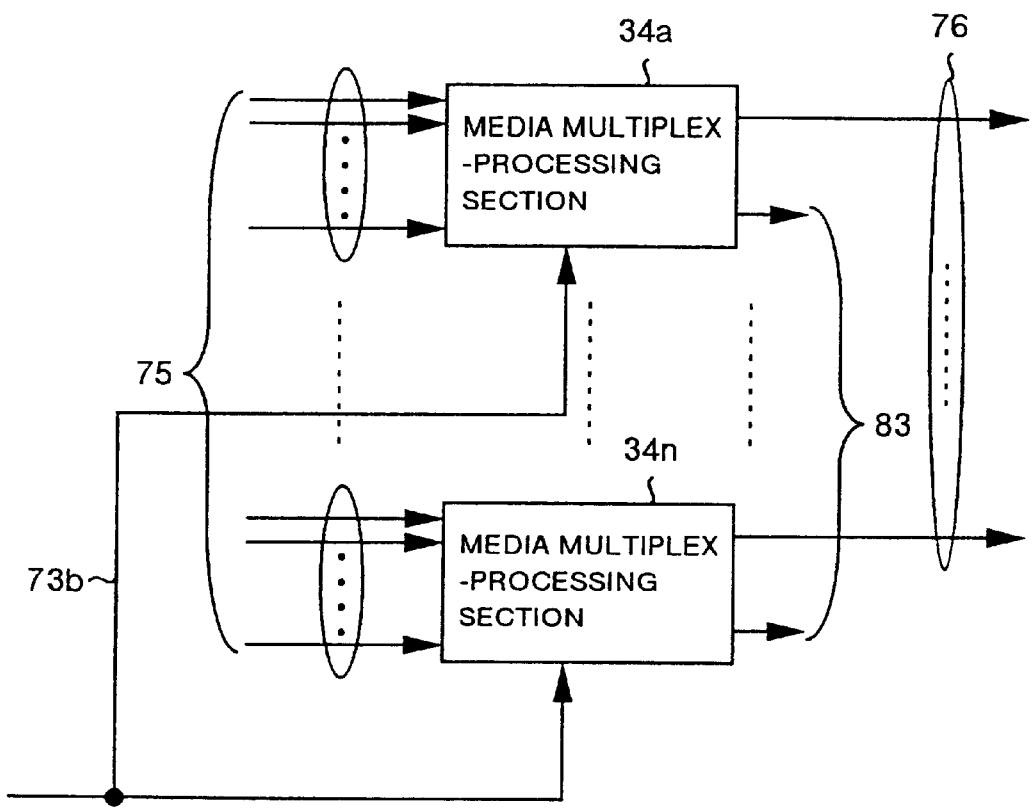
FIG. 3 is a block diagram showing a media multiplexing section in the multiplexing transmitter according to the embodiment of the present invention.

The media multiplexing section 34 multiplexes, as shown in FIG. 3 showing the configuration thereof, a plurality of media encoded bit streams 75 for each packet, and generates a media multiplexed bit stream (a program bit stream) 76 for each program (broadcast program). Namely, a plurality of media (e.g. one video, two voices, one data) constituting one unit of program are multiplexed as a single unit by a media multiplex-processing section 34a. Multiplexed additional information indicating which of the media information has been multiplexed is also multiplexed.

It should be noted that, as a method of selecting media information corresponding to a specified program from the encoded bit streams 75, in a case where relation between output from the information-source encoding section 31 and a program is fixed, the two may be connected to each other by H/W, or may be variable by providing a switching function in the previous stage. Further, S/W processing is also possible.

Herein, processing for multiplexing the encoded bit streams 75 by the media multiplexing section 34 is controlled according to the priority corresponding to each media information indicated by a control signal 73b from the control section 33. This multiplexing control indicates preferentially multiplexing of the information with higher priority by controlling ON/OFF of the multiplexing according to the priority for each encoded bit stream 75 in a case where there is a limitation in a bit rate per media multiplexed bit stream 76. (It should be noted that multiplexing or not multiplexing certain media information is supposed to control a transmission rate of the media information).

In the embodiment, the priority is decided as described below.

Contents information 71 for each media signal constituting the media signal 74 inputted in the information-source encoding section 31 is inputted in the priority deciding section 32.

The priority deciding section 32 decides priority of each media and that for each program (broadcast program) according to the contents information 71, and generates an priority information 72.

For example, when a type of media (videos, sounds, various types of data or the like), an information-source encoding system (non-layer encoding, layer encoding [base layer], layer encoding [enhancement layer] or the like), contents of a broadcast program (movies, news, sports, or the like), a mode of broadcast (ordinary broadcast/emergency broadcast, a current type of television/HDTV, monolingual/bilingual, monophonic/stereophonic or the like) or some other condition are given according to the contents information 71, priority in each media as well as priority in each program are decided based on the previously decided order according to those contents. Higher priority in each program, for instance, is supposed to be set in emergency news than in entertainment broadcast, while higher priority in each media is supposed to be set, among movie broadcast programs, in video information than in sound information.

It should be noted that, although a case of deciding priority from the contents information 71 is described herein, the way of deciding priority is not limited thereto, and, for instance, priority may be decided by receiving a request from the side of receiving the multiplexing information.

Priority in each media and in each program is decided as described, is sent to a control section 33 as priority information 72, and the control section 33 controls multiplexing of a media multiplexing section 34 according to the control signal 73b based on the sent information and provides control so that preferential multiplexing is executed from the media information with a higher priority in the same programs.

It should be noted that, in the media multiplexing section 34, time information is cyclically added to a multiplexed packet when media are multiplexed to ensure synchronous regeneration of multiplexed data in the side of using the multiplexed one. As for a clock providing time information, a different one may be used for each of media multiplexing in media multiplex-processing sections 34a, . . . , 34n, respectively.

In a case where an encoded bit stream 75 includes a hierarchically encoded on in the information-source encoded section 31, encoded bit streams for the corresponding base layer as well as enhancement layer are discretely subjected to media multiplexing, and discrete media multiplexed bit stream is generated. However, the bit streams are subjected to media multiplexing respectively using a common clock to ensure synchronous regeneration between the layers.

Further, the media multiplexing section 34 shown in FIG. 3 detects a bit rate 83 for each media multiplexed bit stream and sends the rate to the control section 33.

Media multiplexed bit stream 76 for each program outputted from the media multiplexing section 34 are multiplexed as a group obtained by making a single unit with a plurality of programs in the program multiplexing section 36, and program multiplexed bit streams 78 for a plurality of groups (channels) are generated.

Herein, multiplex-processing of the media multiplexed bit stream 76 in the program multiplexing section 36 is also controlled, as in the media multiplexing section 34, according to the priority corresponding to each program indicated by a control signal 73c from the control section 33.

The multiplexing control is to efficiently use a limited transmission band (a bit rate) by selecting any program (an important program, to be multiplexed from a plurality of media multiplexed bit streams 76, for instance, in a case where a transmission band per program multiplexed bit stream is limited.

A method of deciding priority corresponding to each program is decided by the priority deciding section 32 as described above.

The control section 33 controls multiplexing in the program multiplexing section 36 according to a control signal 73c based on the priority in each program, and control is provided so that multiplexing is preferentially executed from the higher priority program.

The program multiplexing section 36 also detects a bit rate 84 for each program multiplexed bit stream and inputs the detected rate to the control section 33.

As described above, control can be provided over multiplexing based on the media information or the priority corresponding to each program, so that multiplexing using a band efficiently can be carried out.

It should be noted that it is also possible to control multiplexing in consideration of priority in each program when multiplexing is to be controlled in the media multiplexing section 34, and reversely, it is also possible to control multiplexing in consideration of priority in each media when multiplexing is to be controlled in the program multiplexing section 36.

Herein, description is made for the multiplexed additional information generating section 35. The section is provided for multiplexing information indicating priority therein for using the multiplexed information when multiplexing is controlled according to the priority therein, so that processing such as output and edit/process or the like can be executed for each priority when the multiplexed information is to be used.

Figure 8:
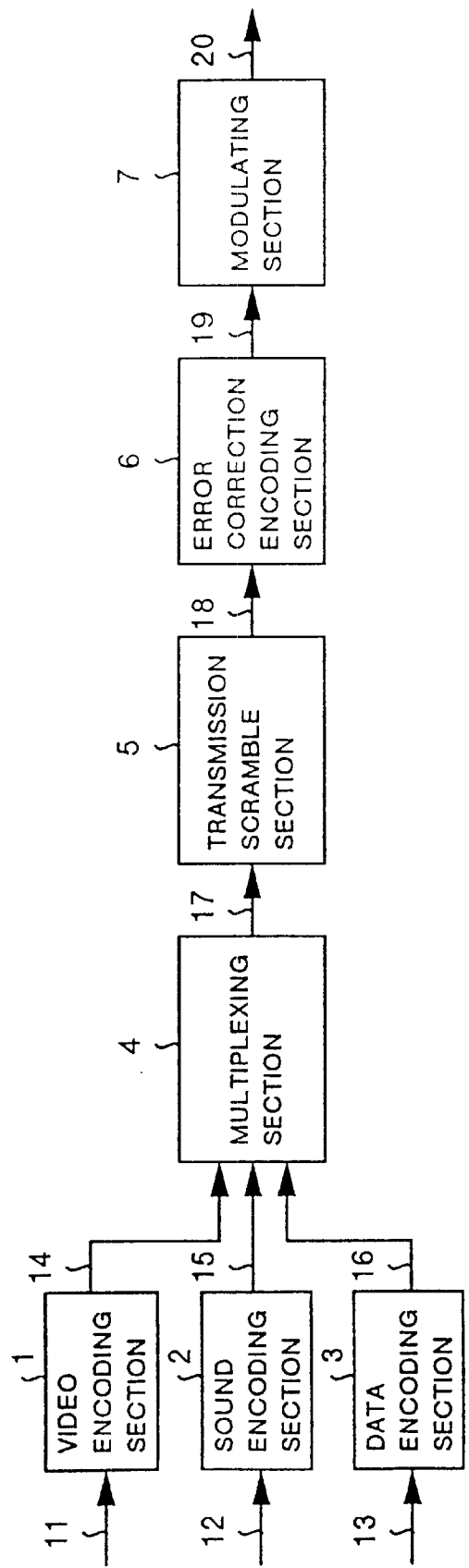
FIG. 8 is a functional block diagram showing the multiplexing/transmitting system based on the conventional technology.
Figure 9:
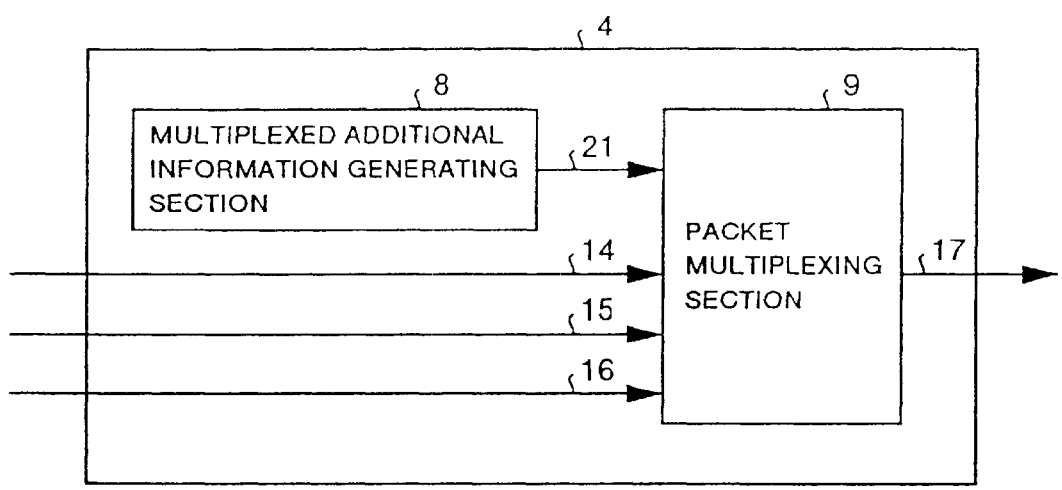
FIG. 9 is a block diagram showing the multiplexing section in the multiplexing/transmitting system based on the conventional technology.

The multiplexed additional information generating section 35 generates, like the multiplexed additional information generating section 8 in the conventional type of multiplexing/transmitting system shown in FIG. 8, multiplexed additional information 77 indicating conditions of multiplexing/arrangement of each of encoded bit stream or the like.

However, the multiplexed additional information generating section 35 is different from the conventional type of multiplexed additional information generating section 8 in a point that the section 35 generates priority correlation table information described below.

The priority correlation table information comprises, as shown in FIG. 4, packet identifying information 35a for identifying each encoded bit stream 75 multiplexed for each packet in the information-source encoding section 31, program identifying information 35b for identifying each media multiplexed bit stream 76 obtained by that encoded bit streams 75 are multiplexed for each program in the media multiplexing section 34 to be outputted, group identifying information 35c for indicating association between the media multiplexed bit streams 76 multiplexed for each group in the program multiplexing section 36, and priority information 35d indicating priority of each packet and program.

The priority information 35d further comprises information for priority in a program, information for priority among programs, information for priority in a group, and information for priority among groups. In this example, decision of the priority is executed according to the priority information 72 and control information 73.

The information for priority in a program indicates priority of an encoded bit stream for various types of media which are elements constituting a program and is obtained by referring to the priority information 72 decided in the priority deciding section 32.

The information for priority among programs indicates priority for each media multiplexed bit stream included in the same group made in the program multiplexing section 36. It is assumed that time information obtained from the common clock is added to a media multiplexed bit stream having the same group information.

With this feature, synchronous regeneration of multiplexed data is insured between the media multiplexed bits each having the same group information. It is also assumed that media multiplexed bit streams each having the same group information are all transmitted over the same transmission channel while one or a plurality of groups are transmitted for each transmission channel.

For example, media multiplexed bit streams obtained by multiplexing layered data which is relative to each other have the same group information, and the media multiplexed bit stream obtained by multiplexing data for standard quality has the highest priority in the group, while the media multiplexed bit stream obtained by multiplexing data for high quality has the lower priority than the above stream in the group.

The information for priority in a group indicates priority in encoded bit streams for various types of media which are elements in the same group and is obtained by referring to the priority information 72 and the control information 73.

The information for priority among groups indicates priority of each group and is set manually or by referring to the priority information 72 and control information 73. For instance, the highest priority among groups is allocated to the group including a multiplexed packet with the highest priority in a group first, and the second highest priority among groups is allocated to a multiplexed packet with the second highest priority and for forth, and in a case where maximum values of each priority in a group are identical, priority among groups is decided in each group by comparing the second highest priority in a group to each other.

It should be noted that it is assumed in the embodiment that "1" is allocated to the highest priority and a numerical values becomes larger in accordance with lower priority. Allocation or priority may be a way of relative allocation or a way of absolute allocation.

Further, priority information for priority correlation table comprises the four types of priority information as described above in the embodiment, however, the priority information 72 may be used as it is to set priority information for each multiplexed packet. Some of the priority information may be omitted. For example, in a case where any of the program multiplexed bit streams 78 has the same group information, both of or one of the priority information among groups and group information may be omitted.

The priority correlation table information generated as described above is sent to the program multiplexing section 36 as multiplexed additional information 77 to be added (multiplexed) to each channel. With this operation, when multiplexed information is to be used, processing such as output, edit/process or the like can be executed for each priority using the priority correlation table information.

The embodiment relates to a multiplexed transmitter for transmitting multiplexed information, and description is made hereinafter for operations of a section corresponding to the channel coding means.

Figure 5:
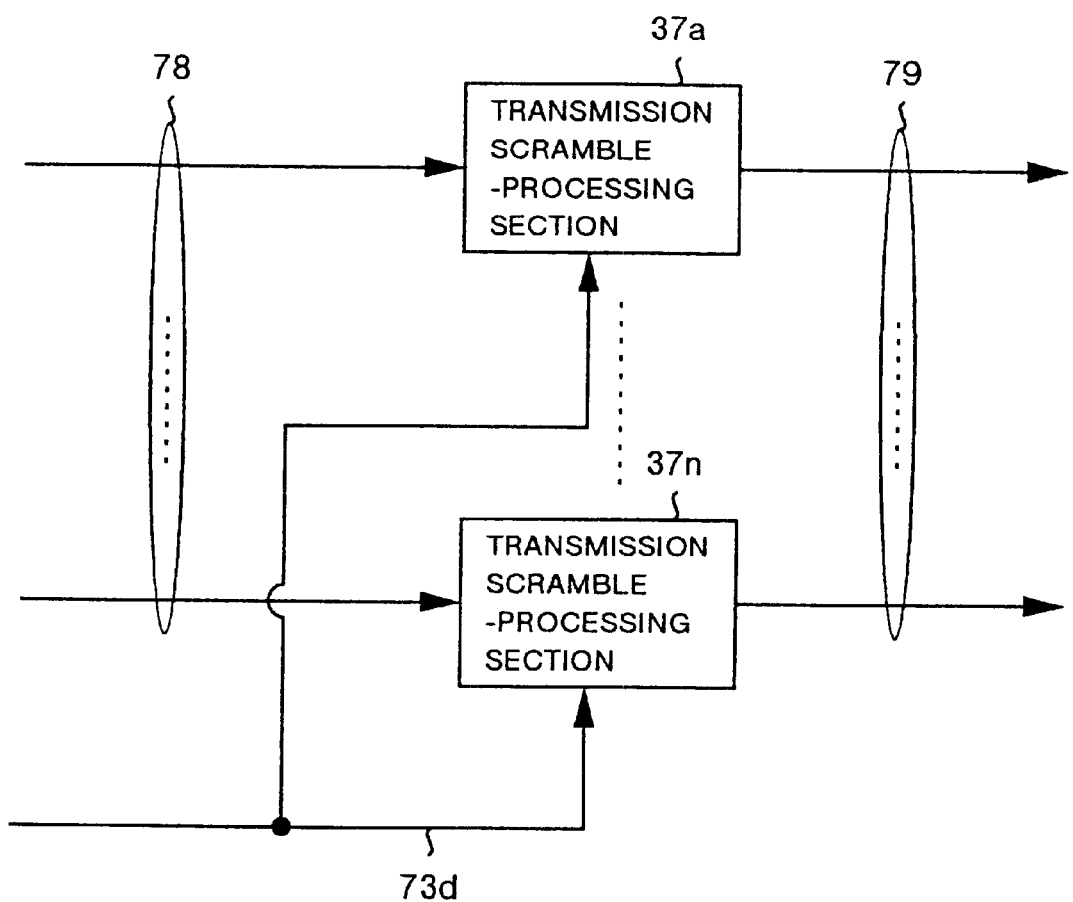
FIG. 5 is a block diagram showing a transmission scramble section in the multiplexing transmitter according to the embodiment of the present invention.

As described above, program multiplexed bit streams 78 for a plurality of channels outputted from the program multiplexing section 36 are sent to the transmission scramble section 37. FIG. 5 is a block diagram showing an example of configuration of the transmission scramble section 37. The transmission scramble section 37 receives the program multiplexed bit streams 78 for a plurality of channels, subjects each program multiplexed bit stream 78 to processing by each of transmission scramble-processing sections 37a, . . . , 37n, and outputs the program multiplexed bit streams 79 for a plurality of channels subjected to energy dispersal. Each transmission scramble characteristics is controlled according to a control signal 73d from the control section 33.

Figure 6:
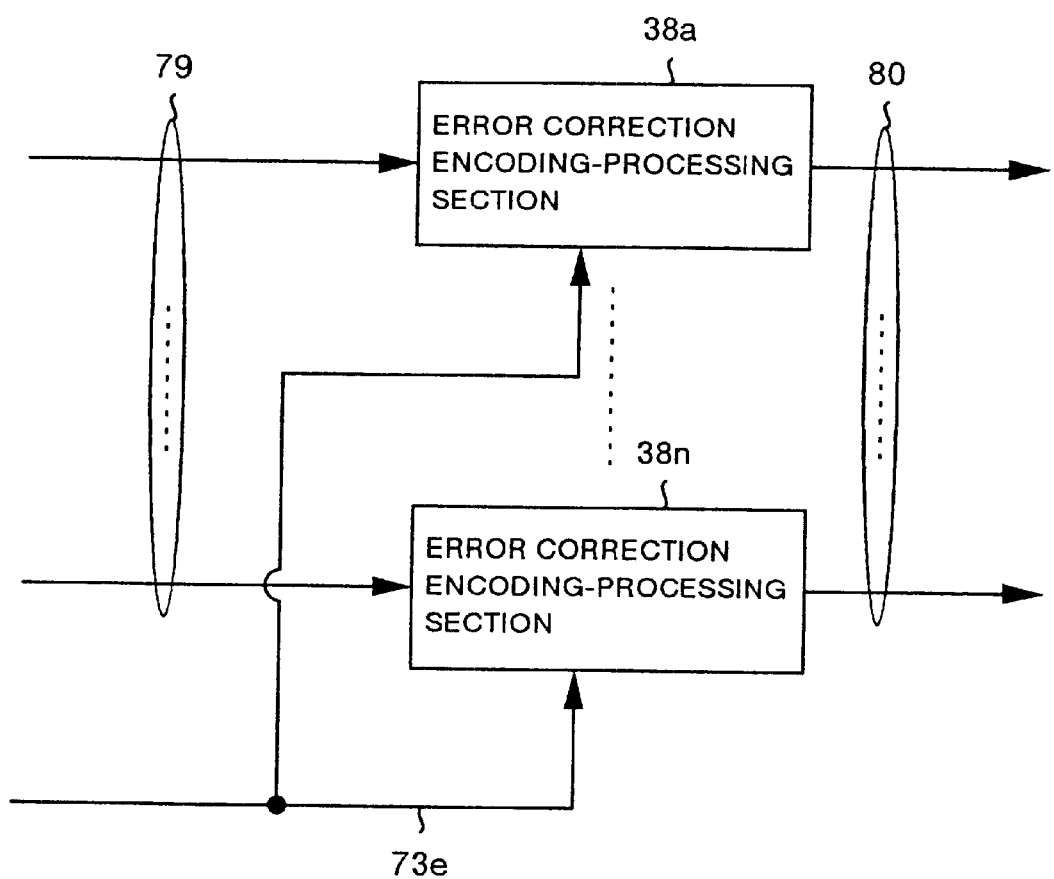
FIG. 6 is a block diagram showing an error correction encoding section in the multiplexing transmitter according to the embodiment of the present invention.

The program multiplexed bit streams 79 are sent to the error correction encoding section 38. FIG. 6 is a block diagram showing an example of configuration of the error correction encoding section 38. The error correction encoding section 38 receives the program multiplexed bit streams 79 for a plurality of channels subjected to energy dispersal, subjects each program multiplexed bit stream to error correction encoding by each of error correction encoding-processing sections 38a, . . . 38n, and outputs the program multiplexed bit streams 80 for a plurality of channels subjected to error correction encoding. Each error correction encoding characteristics is controlled according to a control signal 73e therefrom.

A modulating section 39 modulates the program multiplexed bit streams 80 for a plurality of channels subjected to error correction encoding, outputs a transmission signal 81 for one or a plurality of channels, and the signal(s) is transmitted.

Herein, the modulation is controlled according to a control signal 73f. In the embodiment, OFDM (Orthogonal Frequency Division Multiplexing) is used for a modulating system. As for a modulating system for each carrier, according to a control signal 73, 64 QAM (Quadrature Amplitude Modulation) which is high in frequency utilized efficiency is used for a low-priority program multiplexed bit stream, and QPSK (Quadrature Phase Shift Keying) which is high in error resistance is used for a high-priority program multiplexed bit stream.

The modulating section 39 generates, in a case where the OFDM (Orthogonal Frequency Division Multiplexing) is employed as the modulating system therein, a program multiplexed bit stream 78 corresponding to each carrier.

It should be noted that, as described above, the control section 33 generates control signals 73a to 73f for appropriately controlling information-source encoding characteristics (quantizing characteristics, encoded bit rate or the like), media multiplexing, generation of multiplexed additional information, program multiplexing, a transmission scramble system, an error correction encoding system, and a modulating system according to a bit rate 82 for information-source encoding from the priority information 72 as well as from the information-source encoding section 31, a bit rate 83 for each media multiplexed bit stream from the media multiplexing section 34, and a bit rate 84 for each program multiplexed bit stream from the program multiplexing section 36.

In the embodiment, the media multiplexing, program multiplexing, transmission scramble system, error correction encoding system, and the modulating system are appropriately controlled according to the control signals 73a to 73f, so that it is required to transmit the contents of control to a receiving side. Accordingly, those controlled contents are modulated as the highest priority signals to be transmitted on a carrier or a transmission channel which is strongest in error resistance.

In the embodiment, by making encoded bit streams 75 for a plurality of media to encoded bit streams each for a different object respectively and setting that priority information 72 is indicated as priority of each object, hierarchically classified information according to each object can efficiently be multiplexed for transmission and has sufficient resistance to an error of transmitting channel. In addition, information is multiplexed for each object, so that the received information can easily be edited or processed for each object in the side of receiver.

Further, in the embodiment, error resistance is strengthened to important information to be transmitted, so that it is possible to realize phased degradation so-called graceful degradation in received information according to quality of a transmission line.

Figure 7:
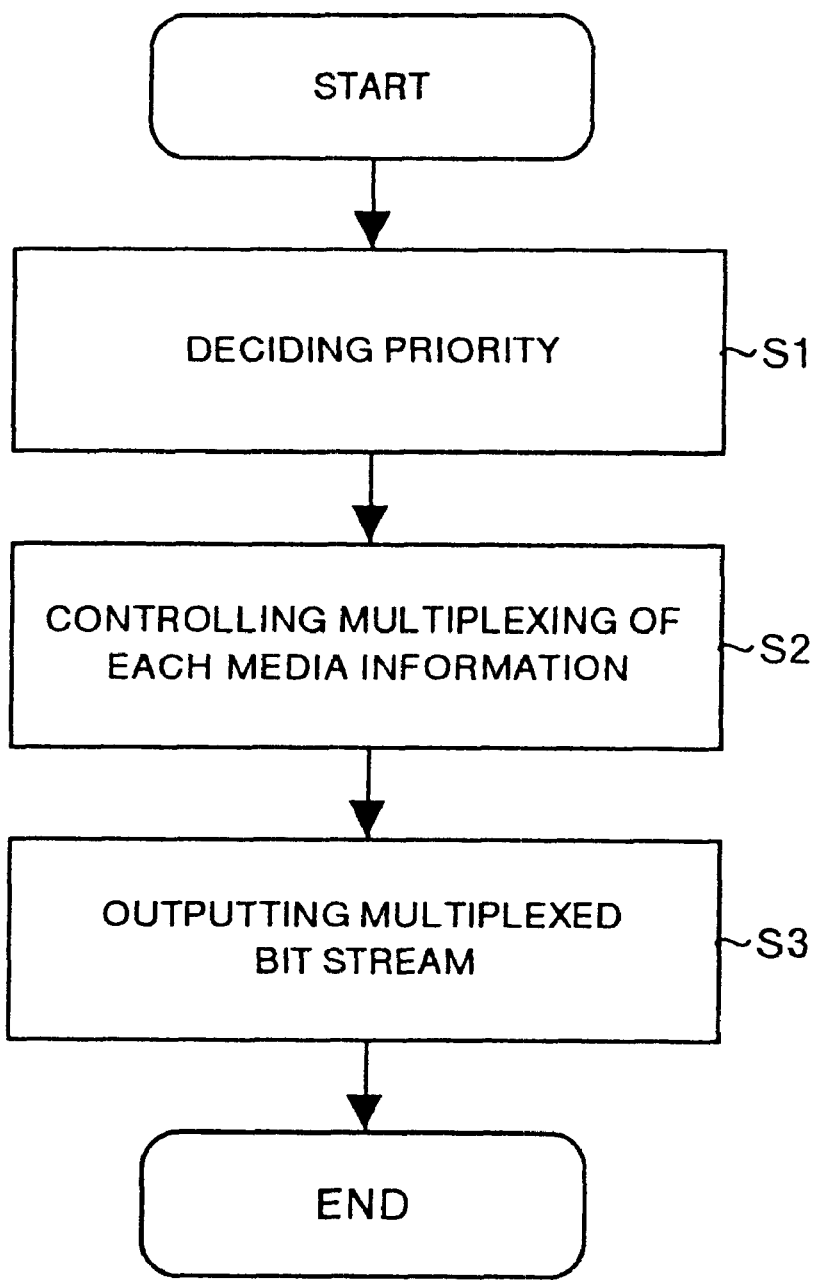
FIG. 7 is a flow chart showing each steps of the multiplexing method according to the embodiment of the present invention.

Next description is made for operations in accordance with the flow chart of FIG. 7.

In this step, a priority corresponding to a plurality types of media information is decided (step S1).

In second step, a multiplexing of each media information is controlled according to the decided priority (step S2).

In the third step, a multiplexed bit stream is outputted (step S3).

It should be noted that each section in the above embodiment can be realized by means of both a hardware circuit and a software circuit.

As described above, with the present invention, media information or program information is controlled for multiplexing according to the priority therein, which makes it possible to efficiently multiplex information according to the priority.

It is also possible to efficiently transmit information multiplexed corresponding to the priority by means of a channel coder.

In addition, priority information is multiplexed, which makes it possible to edit and process the multiplexed information for each priority in the side of user.

This application is based on Japanese patent application No. HEI 8-228317 filed in the Japanese Patent Office on Aug. 29, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multiplexer device comprising:
   a multiplexer for multiplexing a plurality of media information; and
   a priority correlation table information generating means for generating priority correlation table information which contains information on association and/or priority among the media information;
   wherein said multiplexer multiplexes the priority correlation table information; and
   wherein the priority correlation table information includes at least one of packet identifying information identifying each packet in the multiplexed bit stream, program identifying information identifying each program composed of the media information, group identifying information indicating association among programs, and priority information indicating the priority.

2. The multiplexer device according to claim 1; wherein the priority information includes priority of each program and/or priority of each media information within each program.

3. The multiplexer device according to claim 1, wherein the plurality of media information include at least two different types of media content, the multiplexer device further comprising:
   a priority deciding unit for assigning priority to each of the media information based on the media content of the media information; and
   a multiplexing controller for controlling said multiplexer to multiplex the media information according to the priority assigned by said priority deciding unit.

4. The multiplexer device according to claim 1, wherein the priority information includes priority of each program and/or priority of each media information.

5. A multiplexer device comprising:
   a priority deciding unit assigning priority to each of a plurality of media information and assigning priority among a plurality of programs;
   a first multiplexer multiplexing the plurality of media information, wherein packets for the respective media information are multiplexed, and outputting a multiplexed media bit stream;
   a second multiplexer receiving a plurality of multiplexed media bit streams that correspond to different programs and multiplexing packets of the plurality of multiplexed media bit streams;
   a multiplexing controller controlling said first and second multiplexers to perform packet-based multiplexing according to the priority assigned by said priority deciding unit; and
   a priority correlation table information generator generating priority correlation table information which contains information on association and/or priority among the media information and the programs;
   wherein said second multiplexer multiplexes the priority correlation table information; and
   wherein the priority correlation table information includes at least one of packet identifying information identifying each packet in the multiplexed bit stream, program identifying information identifying each program, group identifying information indicating association among programs, and priority information indicating the priority.

6. The multiplexer device according to claim 5; wherein the priority information includes priority of each program and priority of each media information within each program.

7. A multiplexer device comprising:
- a priority deciding unit assigning priority to each of a plurality of media information and assigning priority among a plurality of programs;
- a first multiplexer multiplexing the plurality of media information, wherein packets for the respective media information are multiplexed, and outputting a multiplexed media bit stream;
- a second multiplexer receiving a plurality of multiplexed media bit streams that correspond to different programs and multiplexing packets of the plurality of multiplexed media bit streams;
- a multiplexing controller controlling said first and second multiplexers to perform packet-based multiplexing according to the priority assigned by said priority deciding unit; and
- a priority correlation table information generating means for generating priority correlation table information which contains information on association and/or priority among the media information;
- wherein said multiplexer multiplexes the priority correlation table information; and
- wherein the priority correlation table information includes at least one of packet identifying information identifying each packet in the multiplexed bit stream, program identifying information identifying each program, group identifying information indicating association among programs, and priority information indicating the priority.

8. The multiplexer device according to claim 7, wherein the priority information includes priority of each program and priority of each media information.

9. A multiplexer device comprising:
- a multiplexer for multiplexing packets of a plurality of media information; and
- a priority correlation table information generator generating priority correlation table information which contains information on association of each media information and each program and/or information on priority of each media information and each program;
- wherein said multiplexer multiplexes said packets of media information and said priority correlation table information; and
- wherein said priority correlation table information includes packet identifying information for identifying each media information in the multiplexed bit stream corresponding to said packets, program identifying information for identifying each program, group identifying information indicating an association among programs, and priority information indicating priority of said media.

10. The multiplexer device according to claim 9, wherein said priority correlation table information includes packet identifying information for identifying each media information in the multiplexed bit stream corresponding to said packets, relationship identifying information for identifying relation among media, and priority information indicating priority of said media.

11. The multiplexer device according to claim 10, wherein the information indicating priority of the media information is provided hierarchically in correspondence to the information indicating correspondence among the media information.

12. The multiplexer device according to claim 10, wherein the information indicating priority of the media information includes priority information indicating priority of said program and priority information indicating priority of each medium included in the program.

13. The multiplexer device according to claim 10, wherein the media information is encoded objects and the information indicating correspondence among said media information is information indicating a relation between objects.

14. The multiplexer device according to claim 10, wherein the information indicating priority of the media information indicates the priority using numbers.

15. A multiplexer device comprising:
- a multiplexer multiplexing priority media information and outputting a multiplexed media bit stream;
- a multiplexing controller controlling said multiplexer to perform packet-based multiplexing according to a priority of multiplexing; and
- a channel coder for subjecting the multiplexed bit stream to channel coding by controlling error tolerance of data according to importance of data.

16. The multiplexer device according to claim 15 further comprising:
- a priority correlation table information generator generating priority correlation table information which contains information on association of each media information and each program and/or information on priority of each media information and each program;
- wherein said multiplexer multiplexes the priority correlation table information.

* * * * *